April 18, 1961 L. COUNTS 2,979,949
COMBINATION LIQUID LEVEL GAUGE AND FILLING DEVICE
Filed May 7, 1959
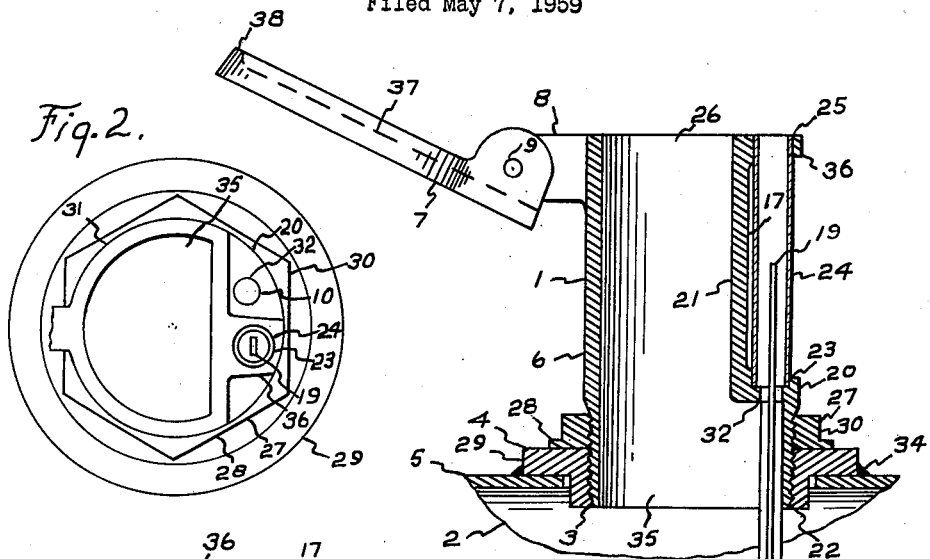
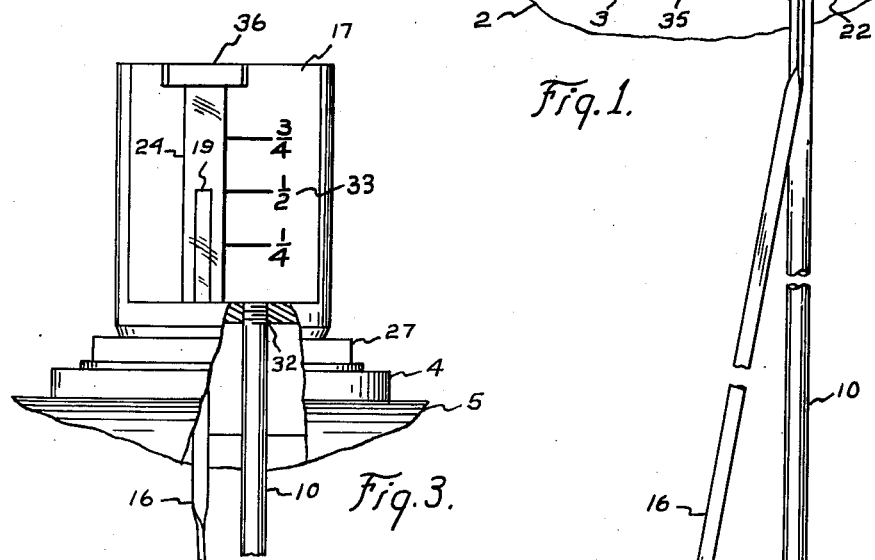
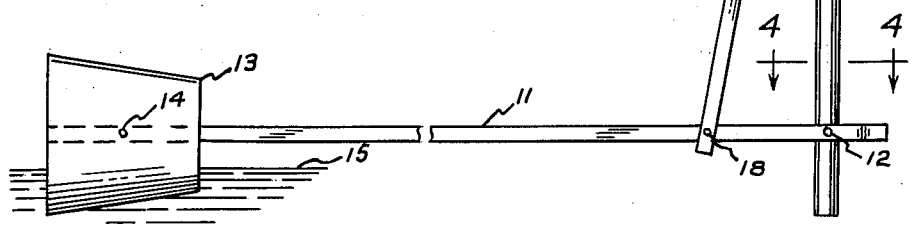
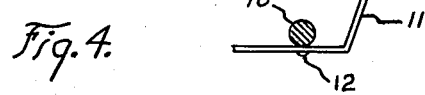
INVENTOR.
LESLIE COUNTS
BY
George H. Baldwin United States Patent Office 2,979,949
Patented Apr. 18, 1961

2,979,949
COMBINATION LIQUID LEVEL GAUGE AND FILLING DEVICE
Leslie Counts, 1940 Chaseville Road, Jacksonville 11, Fla.
Filed May 7, 1959, Ser. No. 811,711
2 Claims. (Cl. 73—317)

This invention relates to an indicator and more particularly to a float type liquid level indicator for liquid holding vessels such as tanks, drums and the like which is permanently installable in an opening in such vessels and adapted to function as a conduit for the admission of liquids thereinto.

For liquid holding vessels, such as tanks, drums, and the like, it is desirable to have a means for indicating the amount of fluid contained within the vessel. Devices suitable for indicating the liquid level in tanks are known and are generally classified into two categories, i.e. those in which the fullness of the tank is indicated in response to variances in the weight of the liquid in the tank and those in which the fullness of the tank is ascertained in accord with the level of the liquid in the tank. This invention relates to tank gauges or indicators which indicate the degree of fullness in accord with the sensed level of the liquid in the tank.

In the Southern part of the United States house heating is widely accomplished by the firing of liquid fuels which are usually stored exteriorly above ground in drums and tanks such as the well known cylindrical steel type drums which have a typical nominal capacity of about 55-gallons of liquid. Such drums usually have but two openings, one for the withdrawal of oil which is disposed at the end of and adjacent the side wall of the tank, and the other of which is disposed in the top portion of the cylindrical wall between the opposite ends of the tank. This latter opening is employed in the filling of the tank since the tanks are most conveniently supported on the side walls, and cannot be conveniently employed in the mounting of a liquid level gauge attachment because if a float type gauge is mounted on the tank so as to pass through the opening, the gauge must be removed each time the tank is filled.

It is a general object of the invention to provide a liquid level gauge for liquid holding vessels such as tanks, drums and the like.

Another object is to provide a gauge for indicating liquid level in drums and tanks and which is so constructed as to be permanently installable in a tank opening and yet adapted to permit the filling of the tank through the opening employed for the installation of the gauge.

Another object is to provide an inexpensive, simple, and easily constructed float type liquid level indicator for tanks and the like which is installable in an opening of a tank, the liquid level of which is to be indicated thereby, and which permits the passage of liquid through the opening in which the indicator is installed without the removal of the indicator from the tank.

Another object is to provide a liquid level indicator which is incapable of collecting liquid condensate, and which furthermore may be installed in a tank opening without the necessity of being removed when the tank is being filled through said opening, and which provides venting means for the venting of air from the tank during the filling thereof and which further incorporates a convenient hinged cap serving to prevent dirt or rain from entering the tank, yet which permits venting through the device.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

Fig. 1 is a side elevational view of the liquid level gauge as attached to a tank, certain parts being in section or broken away to facilitate a clearer understanding of the construction thereof;

Fig. 2 is a top view of the device of Fig. 1, certain parts being broken away;

Fig. 3 is a front view of the embodiment shown in Fig. 1; and

Fig. 4 is a sectional view along the lines 4—4 of Fig. 1.

With particular reference to Fig. 1, the liquid level gauge is generally depicted therein at 1. The gauge 1 as shown in the figure is mounted on a conventional 55-gallon cylindrical drum or tank 2 and extends in its mounted position through drum opening 3 defined by internally threaded annular shoulder 4. The shoulder 4 is suitably attached to the side wall 5 of tank 2 as by weld 34 and functions in many uses for this type tank as a seat for a peripherally threaded disc-like bung, not shown.

The gauge 1 includes an open ended hollow and generally cylindrical body member 6 which, as shown in Fig. 1, is adapted at its lower end for threaded engagement with shoulder 4 of tank 2. The body member 6 extends above the tank 2 to a cover 7 which is pivotally attached to a rearwardly extending integrally formed lip portion 8 thereof by means of pivot pin 9. The body member 6 has an open sided elongated hollow portion 35, through which liquid may be passed and accordingly the member 6 serves as a conduit through which liquid such as oil may be received during the filling of the tank 2.

Attached to and depending from the body portion 6 is a rod 10 which carries at its lower end a pivot arm 11 which is pivotally secured to the rod 10 by means of pivot pin 12. Pivot arm 11 is disposed within the tank 2 and extends rearwardly of its pivotal connection with rod 10 to a suitable float 13 which may be composed of cork or any other suitable material. Float 13 is connected to arm 11 by means of pin 14 and rises and falls in tank 2 in accord with the level of liquid 15 therein, thereby causing the arm 11 to pivot about its pivotal connection 12 to rod 10.

A generally upstanding elongated indexing arm element 16 is suitably pivotally connected at its lower end, as by means of pivot pin 18, to pivot arm 11, the pivotal connection 18 being disposed spacedly rearwardly of pivot 12 on arm 11 so that pivotal motion of liquid level sensing arm 11 is transmitted to the arm 16 and causes the element 16 to rise and fall in accord with the rise and fall of float 13. The indexing arm 16 extends upwardly from pivot 18 through a lower portion of the hollow 35 defined by body member 6 and then upwardly through a horizontally disposed plate 20 of the body member 6 to a position at which the upper end portion 19 of element 16 lies in front of an upstanding upper flat walled portion 17 of the body member. At this position the end portion 19 of the arm element 16, which is, for convenience, red in color, may be viewed in conjunction with scale 33, which is of a color, such as white, contrasting with red, for ascertaining the liquid level in tank 2. To facilitate the extension of the sensing arm 16 through the tank opening 3 to a viewable external position relative to the body member 6 and yet to maintain a passageway for the admission of liquid to the tank 2, the upper wall portion 21 of the body member 6 is provided with a flat walled portion 17 which is offset inwardly of the cylindrical contours of the lower wall portion 22 of member 6. Wall 17 is integrally connected to a horizontal segmental shaped plate 20, and plate 20 serves as a connecting member between the lower cylindrical wall portion 22 of the body member 6 and the flat wall 17. The upper end portion 19 of the sensing arm 16 extends through a hole 23 in plate 20 and is protected from damage by means of an aligned transparent open ended hollow vent tube 24 which is fittingly mounted at its lower end in a countersunk portion 23' of hole 23. Tube 24 extends upwardly from its lower mounting in plate 20 to its upper end which is snugly fitted in another hole 25 which is positioned in alignment with tube 24 and hole 23. Hole 25 is provided in a forwardly extending protuberance 36 which is integrally formed with the wall 17 at its upper end and is provided with a centrally located recess portion 37 which is surrounded and partially defined by a depending flange 38. When pivoted into a closing position the cover 7 is adapted to cover not only the upper end 26 of the hollow 35 but also the upper end of the transparent tube 24 with the flange 38 generally surrounding the upper end portions of the tube 24 and member 6 to thereby prevent rain water from leaking into the tank. Cover 7 fits loosely on the elements however so that natural venting can take place.

It will be noted in Fig. 1 that an annular collar 27 with internal threads is threadedly engaged about the lower cylindrical portion of body member 6. This collar 27 provides a means for fixedly connectingly positioning the body member 6 on the tank 2. Thus after the body member 6 has been screwed into the opening 3 defined by annular shoulder member 4 and suitably positioned therein so that the arm 11 extends in a suitable direction, collar 27 is tightly screwed down on shoulder 4 to secure the body member against further rotation. For this purpose collar 27 is provided with a radially extending flange 28 which seats against a radially extending flange 29 of shoulder 4. As shown in Fig. 2, collar 27 is provided with a hexagonal nut portion 30 which facilitates the use of suitable wrenches in accomplishing this function.

Fig. 2 also shows the position of wall 17 as being on a cord of the circle defined in part by the arcuate upper wall sector 31 of the body member 6. The segmental shape of plate 20 is also illustrated therein.

As seen in Fig. 2 the transparent tube 24 is disposed in an offset position in relation to an imaginary plane which passes normal to wall 17 through the center of the aforementioned circle. This is done to facilitate positioning of the upper end of rod 10 in another hole, shown at 32, in plate segment 20. As shown in Fig. 3, rod 10 is secured to the body member 6 by threaded engagement therewith in hole 32 and depends therefrom.

It will also be noted in Fig. 3 that markings 33 which are indexed by the upper end 19 of arm 16 are incorporated on the outer face of wall 17. These markings 33 are calibrated to indicate the relative fullness of tank 2 in accord with the liquid level therein as read at the upper end extremity of arm 16 in tube 24. It will be understood, of course, that the upper end of arm 16 is loosely disposed in tube 24 so as to be slidably movable up and down therein.

To prevent the arm 11 from pivoting to a forward position relative to rod 10, the arm 11, as shown in Fig. 4, is provided with a bent inner end portion 34 which is adapted to engage the rod 10 prior to the arm 11 assuming a position which is parallel to rod 10.

The indicating function of the gauge 1 is deemed obvious from the foregoing. Briefly, however, and with particular reference to Fig. 1, as the liquid 15 in tank 2 falls below the level shown in Fig. 1, the liquid level sensing float 13 of the gauge 1 will pass downwardly since it will follow the liquid level. As the float 13 passes downwardly in accord with a changing liquid level, arm 11 will pivot counterclockwise as viewed in Fig. 1, thereby disposing the indexing arm 16 at a lower position than that shown. As such the upper end extremity of arm 16 shown at 19 will pass downwardly from its presently shown position and thereby point to a lower calibrated value on the scale formed by marking 33.

On the other hand, as liquid is being fed into the tank through the upper end 26 of body member 6, float 13 will follow the liquid level upwardly in the tank 2 and thereby cause arm 11 to pivot clockwise about pivot 12. As arm 11 pivots clockwise, elongated indexing arm 16 is pushed upwardly by means of its pivotal connection at 18 to arm 11, and the upper end extremity 19 of the arm 16 is thereby disposed further upwardly in confining tube 24 and indicates a correspondingly greater reading.

When tank 2 is being filled, the body portion 6 of the gauge 1 functions not only as a passageway for the incoming liquid but also functions as a means for venting air without causing back splash of liquid. The air being displaced passes upwardly through the lower portion of the passageway and is expelled through tube 24. The fact that the entrance to the lower end of the tube is offset from the downward path of incoming liquid prevents entrainment thereof and accordingly prevents splashing back of liquid as would be frequently encountered otherwise.

The instant gauge has a further advantage in that there are no places for condensate to collect and cause corrosion or to otherwise interfere with the function of the device. Any condensate which might form either passes freely down the tube or the passageway formed by the body member 6 into the tank or is freely expelled in the vapor state beneath the loose fitting cover 7.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A combined device for receiving and passing liquid into and for venting a tank and for indicating the liquid level in said tank comprising a body member of generally vertical hollow cylindrical form, said member including a hollow cylindrical lower portion and an aligned upper portion of segmented cylindrical shape, said upper portion including a vertical chordal planar wall portion and a cylindrical wall portion extending circularly for more than 180 degrees joined to said chordal planar wall portion and completing therewith a tank filling conduit continuous throughout said body member, a horizontal plate having a straight edge joined to the lower edge of said planar wall portion extending outwardly therefrom and having an arcuate edge joined to said cylindrical wall of the lower portion of the body member, said plate having a vertical opening therethrough opening downwardly into the interior of said lower portion of said body member and opening upwardly outwardly of said planar wall portion, a transparent hollow open ended vent tube disposed externally of and attached to said plate portion in vertical alignment with said opening, float means pivotally supportedly attached to said body member for sensing the rise and fall of liquid in said vessel, and an elongated index element having an upper end portion extending upwardly through said opening into said tube and loosely disposed therein and having a lower end portion connected to said float means, said upper end portion of said index element comprising movable means viewably disposed with respect to said planar wall portion, and removable cap means closing the upper ends of said tube and fill conduit.

2. A combined liquid level indicator filling conduit, vent tube and cap device for closed oil tanks comprising a vertically extending hollow body member defining a conduit for the passage of liquid therethrough, said member having a hollow cylindrical lower wall portion and an upper wall portion having a hollow communicating with said hollow of said lower wall portion to form therewith a filling conduit, said body member having an open top and an open bottom, said upper wall portion including a vertically extending flat wall offset inwardly of the cylindrical contour of said lower wall portion and a horizontally disposed segmental shaped plate interconnectingly attached to said lower wall portion and said flat wall, said plate having a vertically extending hole therethrough communicating between said hollow of said lower wall portion and the exterior of said body member, a vertically extending hollow transparent tube attached to said body member in alignment and communicating with said hole and disposed parallel to and adjacent the outer face of said flat wall and terminating upwardly at the level of and adjacent said open top of said conduit, a depending rod element fixedly connected to said plate adjacent said hole, an elongated arm pivotally attached at one end to the lower end of said rod element and a float attached to the other end of said arm, an elongated indexing element extending through said hole and having an end loosely disposed within said vent tube and an opposite end pivotally connected to said arm spacedly from said float and from said pivotal connection with said rod element, a cap element hinged to said upper wall and swingable from a closed position loosely overlying the upper ends of said tube and filling conduit to an open position to expose the upper ends of said tube and conduit, and means for attaching the lower wall portion of said body member in a tank opening.

References Cited in the file of this patent

UNITED STATES PATENTS

| | | |
|---|---|---|
| 631,099 | Treibel et al. | Aug. 15, 1899 |
| 790,463 | Taliaferro | May 23, 1905 |
| 1,423,544 | Schaedler | July 25, 1922 |
| 1,463,342 | Stanley | July 31, 1923 |
| 1,768,946 | Anshicks | July 1, 1930 |
| 2,387,011 | Czerner | Oct. 16, 1945 |
| 2,889,708 | Williams | June 9, 1959 |

FOREIGN PATENTS

| | | |
|---|---|---|
| 198,198 | Germany | May 6, 1908 |
| 561,886 | France | Aug. 20, 1923 |
| 1,102,379 | France | May 4, 1955 |